United States Patent
Sang et al.

(10) Patent No.: US 8,895,148 B2
(45) Date of Patent: Nov. 25, 2014

(54) STRUCTURAL ADHESIVE AND BONDING APPLICATION THEREOF

(71) Applicant: Cytec Technology Corp., Wilmington, DE (US)

(72) Inventors: Junjie Jeffrey Sang, Newark, DE (US); Dalip Kumar Kohli, Churchville, MD (US); Kunal Gaurang Shah, Gujarat, IN (US)

(73) Assignee: Cytec Technology Corp., Wilmington, DE (US)

( * ) Notice: Subject to any disclaimer, the term of this patent is extended or adjusted under 35 U.S.C. 154(b) by 147 days.

(21) Appl. No.: 13/652,724

(22) Filed: Oct. 16, 2012

(65) Prior Publication Data

US 2013/0115442 A1 May 9, 2013

Related U.S. Application Data

(60) Provisional application No. 61/557,538, filed on Nov. 9, 2011.

(51) Int. Cl.
| | | |
|---|---|---|
| B32B 7/12 | (2006.01) | |
| B32B 15/092 | (2006.01) | |
| B32B 27/20 | (2006.01) | |
| B32B 27/26 | (2006.01) | |
| B32B 27/38 | (2006.01) | |
| C09J 9/00 | (2006.01) | |
| C09J 163/00 | (2006.01) | |
| C08K 3/36 | (2006.01) | |
| C08K 5/41 | (2006.01) | |
| C08K 7/00 | (2006.01) | |
| C08G 59/38 | (2006.01) | |
| C08G 59/50 | (2006.01) | |
| C08L 81/06 | (2006.01) | |

(52) U.S. Cl.
CPC ........ *C08G 59/5073* (2013.01); *C08G 59/5026* (2013.01); *C08K 3/36* (2013.01); *C08L 81/06* (2013.01); *C09J 163/00* (2013.01); *C08G 59/42583* (2013.01)
USPC .............. 428/414; 428/300.7; 428/301.1; 428/301.4; 428/416; 156/330; 523/428; 523/429; 523/433; 523/440; 523/443; 525/524; 525/529; 525/530; 525/533

(58) Field of Classification Search
None
See application file for complete search history.

(56) References Cited

U.S. PATENT DOCUMENTS

| | | | |
|---|---|---|---|
| 5,726,216 A | 3/1998 | Janke et al. | |
| 6,013,730 A | 1/2000 | McGrail et al. | |
| 2008/0188609 A1* | 8/2008 | Agarwal et al. | ............... 524/504 |
| 2008/0251203 A1 | 10/2008 | Lutz et al. | |
| 2009/0308534 A1 | 12/2009 | Malone | |
| 2010/0016494 A1 | 1/2010 | Burns | |
| 2010/0108259 A1 | 5/2010 | Aspin | |

FOREIGN PATENT DOCUMENTS

| | | | | |
|---|---|---|---|---|
| EP | 2223966 A1 | 9/2010 | | |
| WO | WO 2010099281 A1 * | 9/2010 | ............. | C08L 63/00 |
| WO | 2011/025873 A1 | 3/2011 | | |
| WO | WO2011075128 A1 | 6/2011 | | |
| WO | WO 2013070415 A1 * | 5/2013 | ............. | C08G 59/42 |

OTHER PUBLICATIONS

Pham et al: "Epoxy Resins", Encyclopedia of Polymer Science and Technology, Jan. 1, 2004, pp. 1-127.

* cited by examiner

*Primary Examiner* — Michael J Feely
(74) *Attorney, Agent, or Firm* — Thi D. Dang

(57) ABSTRACT

A structural adhesive composition that is suitable for high-strength bonding of metals and aerospace structural materials. In one embodiment, the structural adhesive composition based on a two-part system, which is curable at or below 200° F. (93° C.). The two-part system is composed of a resinous part (A) and a catalyst part (B), which may be stored separately at room temperature until they are ready to be used. The resinous part (A) includes at least two different multifunctional epoxy resins, toughening components, and inorganic filler particles. The catalyst part (B) includes an aliphatic or cyclic amine compound as a curing agent and inorganic filler. In another embodiment, the structural adhesive composition is based on a one-part system, which includes the components of the resinous part (A) mixed with a latent amine curing agent. The one-part system may further include an imidazole and/or an aliphatic amine.

17 Claims, No Drawings

STRUCTURAL ADHESIVE AND BONDING APPLICATION THEREOF

BACKGROUND

Structural adhesives have been conventionally used for structural bonding in the manufacturing of structural parts that demand stringent mechanical requirements such automobile and aircraft body parts. Generally, heat-curable epoxy adhesives are used as structural adhesives. Such heat-curable epoxy adhesives often require relatively high-temperature curing, e.g. 120-180° C. (248-356° F.). High-temperature curing often requires large autoclaves, higher production run time and may cause exothermic concerns. On the other hand, there are conventional adhesives that are curable at lower temperature, e.g. ambient temperature; however, they lack the toughness and bonding strength properties required for structural bonding in the manufacturing of aerospace structural parts. The structural adhesives for aerospace application must have the durability to withstand the harsh environmental conditions.

For structural bonding operations such as rapid assembly of aircraft parts, it is desirable to have an adhesive that enables low temperature or room-temperature curing flexibility, out-of-autoclave (OOA) processing, and is capable of forming strong bond to both composite and metal surfaces with excellent long-term durability under aerospace environmental conditions.

SUMMARY

The present disclosure provides a structural adhesive composition that is suitable for high-strength bonding of metals and aerospace structural materials, in one embodiment, the structural adhesive composition based on a two-part system, which is curable at or below 200° F. (93° C.), including room temperature (20-25° C. or 68-77° F.). The two-part system is composed of a resinous part (A) and a catalyst part (B), which may be stored separately at room temperature until they are ready to be used. Mixing of part (A) and part (B) is required before application. The resinous part (A) includes at least two different multifunctional epoxy resins with different functionality selected from difunctional trifunctional, and tetrafunctional epoxy resins, certain toughening components, and inorganic filler particles as a rheology/thixotrophy modifying component. The toughening components include core-shell rubber particles with different particle sizes and at least one of an elastomeric polymer and a polyethersulfone polymer. The catalyst part (B) includes one or more aliphatic or cyclic amine compounds as curing agents and inorganic filler particles as a rheology/thixotropy modifying component. The weight ratio of part (A) to part (B) is within the range of 3:2 to 10:2.

In another embodiment, the structural adhesive composition is based on a one-part system which includes the components of the resinous part (A) in the two-part system and a latent amine curing agent. The one-part system may further include an imidazole and/or an aliphatic amine to control the curing kinetics such that further lowering of the curing temperature is possible. The one-part system is curable within the temperature range of 140-300° F. (60-150° C.).

DETAILED DESCRIPTION

For the two-part system, a curable paste adhesive is formed by mixing the resinous Part (A) with the catalyst Part (B) prior to applying the adhesive to a surface. The mixed paste adhesive can be cured at a low temperature of less than or equal to 93° C. (200° F.), including ambient temperature (20-25° C. or 68-77° F.). Low temperature curing enables adhesive bonding of substrates without the use of an autoclave, i.e. out-of-autoclave (OOA). As such, adhesive bonding and coring may be carried out by applying low contact pressure of about 1-3 psi (pounds per square inch) on the bonded substrates with or without external heating. Upon curing within the range of 65° C.-93° C. (150° F.-200° F.), the paste adhesive yields a structural adhesive with a glass transition temperature ($T_g$) of greater than 95° C. (203° F.). In certain embodiments, upon curing at 93° C. (200° F.), the cured adhesive has a $T_g$ of greater than 120° C. (248° F.), e.g. 120° C.-130° C. (248° F.-266° F.).

The resinous part (A) includes at least two different multifunctional epoxy resins with different functionality and selected from difunctional, trifunctional and tetrafunctional epoxy resins, certain toughening components, and inorganic filler particles as a rheology/thixotropy modifying component. The toughening components include a first type of core-shell rubber (CSR) particles having smaller particle sizes of less than 100 nm, and a second type of core-shell rubber particles having larger particle sizes of greater than 100 nm. The toughening components further include at least one of an elastomeric polymer with a functional group capable of reacting with the multifunctional epoxy resins during curing and a polyethersulfone (PES) polymer. In one embodiment, both elastomeric polymer and polyethersulfone are present in the resinous part (A). The catalyst part (B) includes one or more amine curing agents to react with the epoxy resins and inorganic filler particles as a rheology/thixotropy modifying component. The amine curing agents are aliphatic or cyclic amine compounds. The weight ratio of the resinous part (A) to the catalyst part (B) is within the range of 3:2 to 10:2. In a preferred embodiment, the weight ratio of the resinous part (A) to the catalyst part (B) is 2:1.

The resinous part (A) has a storage viscosity in the range of 500-1000 Poise at room temperature (20-25° C. or 68-77° F.) and a density (specific gravity) in the range of 1.0-1.2 g/cc, and the catalyst part (B) has a storage viscosity in the range of 150-300 Poise at room temperature 20-25° C. (68-77° F.) and a density in the range of 0.9-1.1 g/cc. The two parts have a long shell-life and may be stored in separate containers at room temperature for up to one year. When the parts (A) and (B) are mixed, the resultant product is a paste adhesive that is curable at or below 200° F. (93° C.) and has a viscosity of 200-600 Poise, preferably 300-500 Poise, at room temperature 20-25° C. (68-77° F.), thereby allowing the adhesive to be easily applied onto a surface by conventional methods such as bead or film application. From here onwards, the terms "room temperature" and "ambient temperature" will be used interchangeably to refer to the temperature range of 20-25° C. (68-77° F.).

For the one-part system, the resultant adhesive after mixing its components is a curable paste adhesive that is ready for application and is curable within the temperature range of 140-300° F. (60-150° C.), or 160-200° F. (71-93° C.), however, it does not have a long shelf-life at ambient temperature, normally about 15 days. As such, freezing would be required to extend its shelf-life. The one-part adhesive has a viscosity in the range of 400-1000 Poise, preferably 300-500 Poise, at room temperature.

Epoxy Resins

The multifunctional epoxy resins to be used in the resinous part (A) are those poly epoxides containing an average of two to four epoxy groups (oxirane rings) per molecule with the epoxy groups being the terminal groups. A difunctional epoxy resin is an epoxy resin that contains an average of two epoxy groups per molecule, a trifunctional epoxy resin is an epoxy resin, that contains an average of three epoxy groups per molecule, and a tetrafunctional epoxy resin contains an average of four epoxy groups per molecule. The difunctional epoxy resins may have an average epoxy equivalent weight (EEW) in the range of 150-700 g/eq. An epoxy equivalent weight is the molecular weight of the epoxy molecule divided by the number of epoxy groups in the molecule. Thus, for example, a difunctional epoxy having a molecular weight of 400 would have an epoxy equivalent weight of 200. The trifunctional epoxy resins may have an average EEW in the range of 90-180 g/eq. The tetrafunctional epoxy resins may have an average EEW in the range of 100-200 g/eq.

In a preferred embodiment, at least one of the multifunctional epoxy resins is a cycloaliphatic epoxy. In some embodiments, a mixture of all three types of multifunctional epoxy resins (difunctional trifunctional, and tetrafunctional epoxy resins) is present in the resinous part (A) to control the cross-linking density of the cured epoxy resin mixture and to optimize $T_g$ and toughness of the final cured adhesive. In other embodiments, the resin mixture includes a non-cycloaliphatic difunctional epoxy, either a trifunctional epoxy or a tetrafunctional epoxy, and a cycloaliphatic epoxy with epoxy functionality of greater than one (i.e. a cycloaliphatic multifunctional epoxy). Difunctional resin is making up the majority of the resin mixture (more than 50 wt. % of the resin mixture) in all cases. When all three multifunctional epoxy resins are used, the following proportions are preferred, based on the total weight of the resin mixture: more than 50 wt. % difunctional epoxy resin, less than 10 wt. % tetrafunctional epoxy resin, and trifunctional epoxy resin making up the balance.

In general, the multifunctional resins suitable for the resinous part (A) may be saturated, unsaturated, cyclic or acyclic, aliphatic, alicyclic, aromatic or heterocyclic polyepoxides. Examples of suitable polyepoxides include polyglycidyl ethers, which are prepared by reaction of epichlorohydrin or epibromohydrin with a polyphenol in the presence of alkali. Suitable polyphenols therefore are, for example, resorcinol, pyrocatechol, hydroquinone, bisphenol A (bis(4-hydroxyphenyl)-2,2-propane), bisphenol F (bis(4-hydroxyphenyl)methane), bisphenol S, bis(4-hydroxyphenyl)-1,1-isobutane, fluorene 4,4'-dihydroxybenzophenone, bis(4-hydroxyphenyl)-1,1-ethane, bisphenol Z (4,4'-Cyclohexylidenebisphenol), and 1,5-hydroxynaphthalene. Also suitable are the polyglycidyl ethers of polyalcohols, aminophenols or aromatic diamines.

Other types of polyepoxides which may be used are glycidyl polyester resins prepared by reacting an epihalohydrin with an aromatic or aliphatic polycarboxylic acid. Another type of polyepoxide resin is a glycidyl amine which is prepared by reacting a polyamine with an epichlorohydrin. Other suitable multifunctional epoxy resins include multifunctional epoxy novolac resins with two to four epoxy groups. The epoxy novolac resins that are useful include epoxy cresol novolacs and epoxy phenol novolacs. Additional suitable multifunctional epoxy resins include aliphatic multifunctional epoxy such as polyglycidyl ether type epoxy, and sorbitol glycidyl ether.

Liquid multifunctional epoxy resins or a combination of solid and liquid multifunctional epoxy resins may be used to form the resin mixture. Particularly suitable are liquid epoxy resins having relatively low molecular weight derived by reaction of bisphenol A or bisphenol F and epichlorohydrin. The bisphenol-based epoxy resins that are liquid at room temperature generally have an epoxy equivalent weight of from about 150 to about 350 g/eq. The epoxy resins that are solid at room temperature are obtainable from polyphenols and epichlorohydrin and have epoxy equivalent weights of greater than 400 g/eq. The solid epoxy resins differ from the liquid epoxy resins in that they are solid at room temperature and have a melting point of from 45° C. to 130° C.

Examples of difunctional epoxy resins include diglycidyl ethers of bisphenol A-based materials (e.g. Epon™ 828 (liquid epoxy resin) from flexion, DER 331, D.E.R. 661 (solid epoxy resin) supplied by Dow Chemical Co., Tactix 123, and Araldite® 184 supplied by Huntsman Advanced Materials).

Examples of trifunctional epoxy resins include triglycidyl ether of aminophenol e.g. Araldite® MY 0510, MY 0500, MY 0600, MY 0610 supplied by Huntsman Advanced Materials.

Examples of tetrafunctional epoxy resins include tetraglycidyl ether of methylene dianiline (e.g. Araldite® MY 9655 supplied by Huntsman Advanced Materials), tetraglycidyl diaminodiphenyl methane (e.g., Araldite® MY-721, MY-720, 725, MY 9663, 9634, 9655 supplied by Huntsman Advanced Materials), EJ-190 from JSI Co., Ltd., and ERISYS GE-60 from CVC Chemical, Inc.

Suitable cycloaliphatic epoxies comprise compounds that contain at least one cycloaliphatic group and at least two oxirane rings per molecule. Specific examples include diepoxide of cycloaliphatic alcohol, hydrogenated Bisphenol A (Epalloy™ 5000, 5001 supplied by CVC Thermoset Specialties) represented by the following structure:

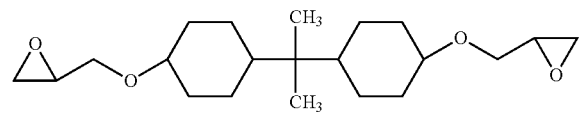 [SMILES: CC(C)(C1CCC(OCC2CO2)CC1)C1CCC(OCC2CO2)CC1]

Other examples of cycloaliphatic epoxies include: EPONEX cycloaliphatic epoxy resins (e.g. EPONEX Resin 1510) supplied by Momentive Specialty Chemicals; cycloaliphatic Epotec® epoxy resins (e.g. YDH 184, YDH 3000) supplied by Aditya Birla Chemicals; ERL-4221 (3,4-epoxycyclohexylmethyl-3',4'-epoxycyclohexane carboxylate) from Dow Chemicals; and Araldite® CY 179 MA supplied by Huntsman Advanced Materials.

Toughening Agents

Two different types of core-shell rubber (CSR) particles are incorporated in the resinous part (A) to create a bi-model particle size distribution with different toughening morphology domains. These CSR particles act as toughening agents which allow for the toughening of the adhesive upon curing. The smaller particles may have an average particle size of less than or equal to 100 nm, preferably 50-90 nm and the larger particles may have an average size of greater than 100 nm, preferably 150-300 nm. The weight ratio of smaller CSR particles to larger CSR particle may be in the range of 3:1 to 5:1. The CSR particles, in total, may be present in the resinous part (A) in an amount of 5%-30% by weight based on the total weight of part (A). By having different particle sizes, one can control the balance of the key properties such as shear strength, peel strength, and resin fracture toughness.

The core-shell rubber particles may have a soft core comprised of a polymeric material having elastomeric or rubbery properties (i.e., a glass transition temperature less than about 0° C., e.g., less than about −30° C.) surrounded by a hard shell comprised of a non-elastomeric polymeric material (i.e., a thermoplastic or thermoset/crosslinked polymer having a glass transition temperature greater than ambient temperatures, e.g. greater than about 50° C.). For example, the core may be comprised of, for example, a diene homopolymer or copolymer (for example, a homopolymer of butadiene or isoprene, a copolymer of butadiene or isoprene with one or more ethylenically unsaturated monomers such as vinyl aromatic monomers, (meth)acrylonitrile, (meth)acrylates, or the like) while the shell may be comprised of a polymer or copolymer of one or more monomers such as (meth)acrylates (e.g., methyl methacrylate), vinyl aromatic monomers (e.g., styrene), vinyl cyanides (e.g., acrylonitrile), unsaturated acids and anhydrides (e.g., acrylic acid), (meth)acrylamides, and the like having a suitably high glass transition temperature. The polymer or copolymer used in the shell may have acid groups that are crosslinked ionically through, metal carboxylate formation (e.g., by forming salts of divalent metal cations). The shell polymer or copolymer could also be covalently crosslinked through the use of monomers having two or more double bonds per molecule. Other elastomeric polymers may also be suitably be used for the core, including polybutylacrylate or polysiloxane elastomer (e.g., polydimethylsiloxane, particularly crosslinked polydimethylsiloxane). The particle may be comprised of more than two layers (e.g., a central core of one elastomeric material may be surrounded by a second core of a different elastomeric material or the core may be surrounded by two shells of different composition or the particle may have the structure of soft core/hard shell/soft shell/hard shell). Typically, the core comprises from about 50 to about 95 percent by weight of the particle while the shell comprises from about 5 to about 50 percent by weight of the particle.

The core-shell rubber particles may be pre-dispersed in a liquid resin matrix system such as those available from Kaneka Texas Corporation under the trademarks Kane Ace MX. It is preferred that the core-shell rubber particles are pre-dispersed in one of difunctional, trifunctional and tetrafunctional epoxy resins to be used in the resinous part (A). As examples, suitable resin matrix systems containing CSR particles include MX 120 (liquid Bisphenol A epoxy with about 25 wt. % CSR), MX 125 (liquid Bisphenol A epoxy with about 25 wt. % CSR), MX 153 (liquid Bisphenol A epoxy with about 33 wt. % CSR), MX 156 (liquid Bisphenol A epoxy with about 25 wt. % CSR), MX 130 (liquid Bisphenol F epoxy with about 25 wt. % CSR), MX 136 (liquid Bisphenol F epoxy with about 25 wt. % CSR), MX 257 (liquid Bisphenol A epoxy with about 37 wt. % CSR), MX 416 and MX 451 (liquid multifunctional epoxy with about 25 wt. % CSR), MX 215 (Epoxidized Phenol Novolac with about 25 wt. % CSR), and MX 551 (cycloaliphatic epoxy with about 25 wt. % CSR).

In addition to CSR particles, thermoplastic and/or elastomeric toughening agents are added to the epoxy resin mixture to further increase the toughness of the finally cured adhesive. Particularly preferred are elastomeric polymers with functional groups capable of reacting with the multifunctional epoxy resins during curing, and a polyether sulfone (PES) polymer having an average molecular weight in the range of 8,000-14,000.

Elastomeric polymers with epoxy functional groups are particularly suitable. Specific examples include epoxy-elastomer adduct formed by reacting epoxy resin with carboxyl-terminated butyl nitrile elastomer or amine-terminated butadiene acrylonitrile (ATBN) elastomer. A specific example is Epon 58005, which is an elastomer-modified epoxy-functional adduct formed from the reaction of the diglycidyl ether of bisphenol A and a carboxyl-terminated butadiene-acrylonitrile elastomer. Additional elastomer modified epoxy resins include Epon 58006, Epon 58042, Epon 58120, Epon 58091 from Hexion Specialty Chemicals, Inc.

Other suitable elastomeric polymers include carboxyl-terminated butadiene nitrile polymer (CTBN) and amine-terminated butadiene acrylonitrile (ATBN) elastomer, or similar reactive liquid polymer chemicals. Moreover, CTBN and/or ATBN may also added to either part (A) or part (B) of the two-part system or to the one-part system to further improve the toughness and resiliency of the adhesive.

The polyether sulfone (PES) polymer includes polyethersulfone-polyetherethersulfone (PES-PEES) copolymer having $T_g$ above 190° C., e.g., KM 170 and KM 180, which have $T_g$ of about 200° C., available from Cytec Industries Inc.

Other suitable toughening agents include phenoxy resins, which are long chain linear poly hydroxy ethers with different molecular weights such as phenol, 4,4'-(1-methylethylidene) bispolymer with (chloromethyl) oxirane. Commercial examples include Phenoxy PKHP-200 and PKHB-100 available from InChem Corp.

Inorganic Fillers

A significant challenge for a resin-based adhesive composition is to maintain the adhesive's rheology performance between the time it is manufactured and the time it is applied. The inorganic fillers act as a thixotropy or rheology modifying component in the two-part or the one-part system. Suitable inorganic filters are those in particulate form and include silica, alumina, calcium oxide, talc, and kaolin. Fumed silica with surface area in the range of 90-380 $m^2/g$ has been found to be suitable for either the two-part system or the one-part system. For the two-part system, the weight percentage of inorganic filler in the resinous part (A) is within the range of 1-6 wt. % based on the total weight of part (A). For the catalyst part (B), the weight percentage of inorganic filler is within the range of 3-10 wt. % based on the total weight of part (B). For the one-part system, the weight percentage of inorganic filler is within the range of 0.5-2.5 wt. %.

In one embodiment of the two-part system, the inorganic filler in the resinous part (A) is hydrophobic fumed silica, such as CAB-O-SIL TS-720 available from Cabot Corporation, and the inorganic filler in the catalyst part (B) is hydrophilic fumed silica, such as CAB-O-SIL M-5 available from Cabot Corporation. In one embodiment of the one-part system, the inorganic filler is hydrophobic fumed silica, such as CAB-O-SIL TS-720. Other examples of fumed silica-based rheology modifiers include Aerosil R202, and VPR 2935 supplied by Evonik Degussa Corp. The presence of fumed silica helps maintain the desired viscosity for the adhesive and also improves the sagging resistance of the adhesive during application and curing. Sagging or slump resistance is desirable when the adhesive is applied on vertical or high-angle surfaces.

Amine Curing Agents for Two-Part System

One or more amine curing agents may be used in the catalyst part (B) of the two-part system. The amine curing agents for the catalyst part (B) are aliphatic or cyclic amine compounds capable of reacting with the multifunctional epoxy resins in part (A) to form highly cross-linked resin matrix. In a preferred embodiment, the amine compounds are selected from the group consisting of cycloaliphatic amines, polyethylene polyamines, amine-terminated piperazines, imidazoles, and combinations thereof. The total weight percentage of the amine curing agent(s) is within the range of 80-95 wt. % based on the total weight of part (B).

Suitable cycloaliphatic amines include dicyclohexylamines such as bis-(paminocyclohexyl)methane (PACM) having the following structure:

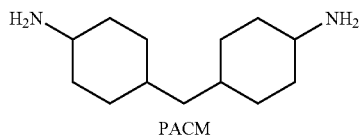 [SMILES: NC1CCC(CC2CCC(N)CC2)CC1]

PACM and dimethyl PACM having the following structure:

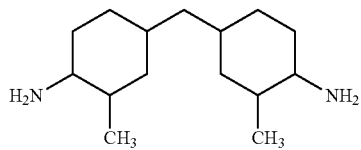 [SMILES: CC1CC(CC2CCC(N)C(C)C2)CCC1N]

Suitable polyethylene polyamines include tetraethylene pentamine (linear C-8 pentamine) having the following chemical structure:

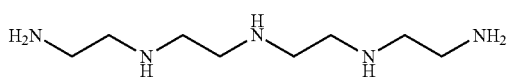

Other suitable examples of polyethylene polyamines include diethylenetriamine (linear C-4 diamine), triethylenetetramine (linear C-6 triamine), and pentaethylenehexamine (linear C-10 hexamine).

An example of a suitable amine-terminated piperazine is 1,4 Bisaminopropyl piperazine having the following structure:

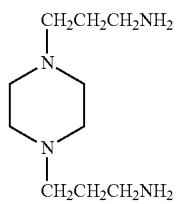

Another example is aminoethyl piperazine having the following structure:

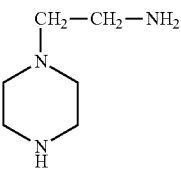

Suitable imidazoles include 2-ethyl-4-methyl imidazole having the following structure:

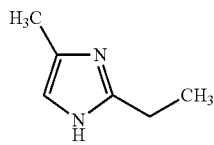

This type of imidazole is commercially available as Imicure EMI-2,4 from Air Products.

Additional examples of amine curing agents include tris-(dimethylaminomethyl) phenol (available as Ancamine K54 from Air Products), and diethylene glycol di(3-aminopropyl) ether (available as Ancamine 1922A).

Amine Curing Agents for One-part System

The curing agents for the one-part system include latent amine-based curing agents, which may be used in combination with at least one of an imidazole and an aliphatic amine. The inclusion of imidazole and/or aliphatic amine further decreases the curing temperature of the adhesive composition. Latent amine-based curing agents that can be activated at a temperature greater than 160° F. (71° C.) are suitable for the one-part system. Examples of suitable latent amine-based curing agents include dicyandiamide (DICY), guanamine, guanidine, aminoguanidine, and derivatives thereof. A particularly suitable latent amine-based curing agent is dicyandiamide. The latent amine-based curing agent may be present in an amount within the range of 2-6 wt %.

A curing accelerator may be used in conjunction with the latent amine-based curing agent to promote the curing reaction between the epoxy resins and the amine-based curing agent. Suitable curing accelerators may include alkyl and aryl substituted ureas (including aromatic or alicyclic dimethyl urea); bisureas based on toluenediamine or methylene dianiline. An example of bisurea is 2,4-toluene bis(dimethyl urea) (commercially available as Omicure U-24 or CA 150 from CVC Chemicals). Another example is 4,4'-methylene bis(phenyl dimethyl urea) (commercially available as Omicure U-52 or CA 152 from CVC Chemicals), which is a suitable accelerator for dicyandiamide. The curing accelerator may be present in an amount within the range of 1-6 wt %. In one embodiment, dicyandiamide is used in combination with a substituted bisurea as a curing accelerator.

Suitable imidazoles include 2-ethyl-4-methyl imidazole, e.g. Imicure® EMI-24, as described above for the two-part system.

Suitable aliphatic amines are those with amine value (mg KOH/g) in the range of 180-300, and equivalent weight (H) in the range of 35-90. Examples of suitable aliphatic amines include Ancamine 2014AS (modified aliphatic amine), and Ancamine 2037S available from Air Products. Other examples of aliphatic amines are Aradur™ 956-4, 943, 42 from Huntsman, and EPICURE™ 3202, 3223, 3234 from Momentive Specialty Chemicals.

In one embodiment of the one-part adhesive, a matrix encapsulated amine, such as Intelimer® 7004 (2-ethyl-4-methyl-imidazole covalently attached to Intelimer® polymer) and Intelimer® 7024 (Intelimer® polymer encapsulated 2-ethyl-4-methyl-imidazole) from Air Products, is used as a latent curing agent. These materials are composed of imidazole-based catalyst encapsulated within Intelimer® polymer via matrix encapsulation. Intelimer® polymers are crystalline polyacrylate polymers in which the crystallinity results from the side chains which are attached to the polymer backbone. These crystalline polymers have a very sharp, well defined melting point. Encapsulation may be done by physical blending or deliberate covalent attachment (i.e. covalently modified polymer). By this encapsulation arrangement, the activity of the amine catalyst is blocked by a polymer network until thermal activation, e.g. curing. The inclusion of these matrix encapsulated amines in the adhesive increases the stability of the adhesive at ambient temperature.

Additional Additives

Additives such as coloring dyes or pigments may be added to the two-part system (either part A or part B) and to the one-part system to adjust the color of the adhesive.

Adhesive Bonding Application

The two-part and the one-part adhesives of the present disclosure are suitable for bonding various aerospace structural materials to form a laminate structure, including metal to metal, metal to composite material, composite material to composite material. Composite materials include fiber-reinforced resin composites, such as prepregs or prepreg layup used for making aircraft composite structures. The term "prepreg" as used herein refers to sheet or lamina of fibers that has been impregnated with a matrix resin. The matrix resin may be present in an uncured or partially cored state. The term "prepreg layup" as used herein refers to a plurality of prepreg layers that are placed adjacent one another in a stack. The prepreg layers within the layup may be positioned in a selected orientation with respect to one another. For example, prepreg layups may comprise prepreg layers having unidirectional fiber architectures, with the fibers oriented at 0°, 90°, a selected angle θ, and combinations thereof, with respect to the largest dimension of the layup, such as the length. It should be further understood that, in certain embodiments, prepregs may have any combination of fiber architectures, such as unidirectional and multi-dimensional.

After mixing, the two-part adhesive composition yields a paste adhesive that can be applied by conventional dispensing means such as bead or film application onto one or more surfaces to be bonded. For structural bonding of metals and aerospace composite materials, the adhesive may be applied at a thickness of 10-80 mils (0.254 mm-2.032 mm). The surfaces are then brought together to form a laminate with an adhesive film in between the substrates. Subsequently, the resultant laminate may be cured at or below 93° C. (or 200° F.), including ambient temperature. Such low-temperature curing method enables out-of-autoclave (OOA) curing of the laminate. The cured adhesive of the two-part system is a structural adhesive with enhanced mechanical properties: a lap shear strength of 33-37 MPa at 20° C.-25° C. and 24-27 MPa at 82° C., 15-18 MPa at 121° C. according to ASTM D3165, a peel strength of 250-350 Nm/m (or 50-75 lbs/in) at 20° C.-25° C. according to ASTM D3167. Furthermore, when the two-part adhesive is used for bonding fiber-reinforced resin composite substrates, it exhibits a fracture toughness (or interlaminar toughness, $G_{1c}$) of greater than 650 J/m², for example, 651-1500 J/m², according to ASTM 5528. The $T_g$ and lap shear strength remain substantially unchanged (more than 90% retention) after aging exposure to air containing relative humidity of 100% at 71° C. for 14 days or at 49° C. for 30 days.

For the one-part adhesive, the cured adhesive film has the following properties: a glass transition temperature ($T_g$) of greater than 100° C. (212° F.) upon curing in the temperature range of 65-93° C. (150° F.-200° F.), a lap shear strength of 28-40 MPa at 20° C.-25° C. and 25-28 MPa at 82° C., 17-21 MPa at 121° C. according to ASTM D3165 testing, a peel strength of 150-250 Nm/m (or 30-50 lbs/in) at 20° C.-25° C. according to ASTM D3167.

ASTM D3.165 refers to a Standard Test Method for Strength Properties of Adhesives in Shear by Tension Loading of Single-Lap-Joint Laminated Assemblies. Lap Shear determines the shear strength of adhesives for bonding materials when tested on a single-lap-joint specimen.

ASTM D3167 refers to a Standard Test Method for Floating Roller Peel Resistance of Adhesives. This test method covers the determination of the relative peel resistance of adhesive bonds between one rigid adherend and one flexible adherend when tested under specified conditions of preparation and testing. Adhesion is measured by peeling the flexible adherend from the rigid substrate. The peel force is a measure of fracture energy.

ASTM D5528 refers to a Standard Test Method for Mode 1 Interlaminar Fracture Toughness of Fiber-Reinforced Polymer Matrix Composites.

The paste adhesive disclosed herein has film-tike properties which enable automated dispensing of the adhesive—this is particularly useful in rapid-assembly, aerospace structure bonding applications. Furthermore, the advantages of the disclosed two-part adhesive include:

Low temperature curing paste with structural adhesive film-like properties
High strength/high toughness and excellent hot/wet properties for metal and composite bonding
Flexible low temperature curing schedule
Stable properties
Long pot life/Long assembly time
No Bagging, OOA Structural Bonding
Thixotropic, slump-resistant; and easy to use
Automation placement capability
Room temperature storage for up to 1 year (1 year shelf life)
Lower Manufacturing cost

EXAMPLES

The following examples are provided for the purposes of illustrating the various embodiments, but are not intended to limit the scope of the present disclosure.

Example 1

Two-Part System

For the two-part adhesive system. Tables 1A and 1B show exemplary formulations for the resinous part (A). A-1 to A-7 represent the more preferred formulations, and A-8 and A-9 are comparative formulations. Table 2 shows exemplary formulations for the catalyst part (B). To form a paste adhesive, any one of A-1 to A-9 may be mixed with any one of B-1 to B-7. Unless indicated otherwise, the amounts in the tables are expressed in parts.

TABLE 1A

| | Resinous Part (A) | | | |
|---|---|---|---|---|
| Components | Part A-1 | Part A-2 | Part A-3 | Part A-4 |
| Diglycidylether of Bisphenol A Liquid Bisphenol A diglycidyl ether with ~25 wt. % CSR particles (particle size = 70-90 nm) | 56 | 60.2 | 46 | 46 |
| Triglycidyl ether of aminophenol | 15 | 11.3 | 29 | 29 |
| Diepoxide of cycloaliphatic alcohol, hydrogenated Bisphenol A (low viscosity cycloaliphatic diepoxide) | 7 | 7.5 | | |
| Tetraglycidyl ether of methylene dianiline | 3.5 | 3.8 | | |
| Sorbitol polyglycol ether (Aliphatic Multifunctional epoxy) | | | | |
| PES-PEES thermoplastic polymer | | | | 4.6 |
| Core-Shell Rubber (CSR) particles (ave. particle size 200 nm) | 4.2 | 4.5 | 10.3 | 5.8 |
| Low MW adduct of epichlorohydrin & bisphenol A | 7 | 7.5 | 9.6 | 9.6 |
| Elastomer-modified epoxy functional adduct | 3.5 | 3.8 | 3 | 3 |
| Hydrophobic fumed silica | 3.8 | 1.5 | 2.4 | 2.4 |
| Total | 100 | 100.1 | 100.3 | 100.4 |

TABLE 1B

| Components | Resinous Part (A) | | | | |
|---|---|---|---|---|---|
| | Part A-5 | Part A-6 | Part A-7 | Part A-8 (comparative) | Part A-9 (comparative) |
| Diglycidylether of Bisphenol A | | | | 60.2 | |
| Liquid Bisphenol A diglycidyl ether with ~25 wt. % CSR particles (particle size = 70-90 nm) | 57 | 57.6 | 57 | | 63 |
| Triglycidyl ether of aminophenol | 18 | 18 | | 11.3 | 11.8 |
| Diepoxide of cycloaliphatic alcohol, hydrogenated Bisphenol A (low viscosity cycloaliphatic diepoxide) | | | | 7.5 | 7.9 |
| Tetraglycidyl ether of methylene dianiline | 3.6 | 3.6 | 3.6 | 3.8 | 3.9 |
| Sorbitol polyglycol ether (Aliphatic multifunctional epoxy) | | | 18 | | |
| PES-PEES thermoplastic polymer | 4.3 | 0 | 4.3 | | |
| Core-Shell Rubber (CSR) particles (ave. particle size 200 nm) | 4.3 | 7.2 | 4.3 | 4.5 | 0 |
| Low MW adduct of epichlorohydrin & bisphenol A | 7.1 | 3.6 | 7.1 | 7.5 | 7.9 |
| Elastomer-modified epoxy functional adduct | 3.6 | 5 | 3.6 | 3.8 | 3.9 |
| Hydrophobic fumed silica | 0.8 | 1.4 | 0.8 | 1.4 | 1.6 |
| Total | 98.7 | 96.4 | 98.7 | 100 | 100 |

TABLE 2

| Components | Catalyst Part (B) | | | | | | |
|---|---|---|---|---|---|---|---|
| | Part B-1 | Part B-2 | Part B-3 | Part B-4 | Part B-5 | Part B-6 | Part B-7 |
| Dimethyl PACM | 92 | | 40 | | | | |
| PACM | | 90 | 55 | | | | |
| Tetraethylene pentamine | | | | 60 | 50 | | |
| 1,4-Bisaminopropyl piperazine | | | | 34 | | | |
| Aminoethyl piperazine (AEP) | | | | | 44 | | |
| Diethylene glycol, di(3-aminopropyl) ether | | | | | | 84 | 90 |
| Tris(dimethylaminomethyl) phenol | | | | | | | 5 |
| Phenol, 4,4'-(1-methylethylidene) bispolymer with (chloromethyl) oxirane toughener) | | | | | | 10 | |
| Untreated fumed silica | 8 | 10 | 5 | 6 | 6 | 6 | 5 |
| Total | 100 | 100 | 100 | 100 | 100 | 100 | 100 |

The resinous part and the catalyst part based on the above formulations were prepared separately by weighting and adding the required components at different steps to a double planetary mixer with heating and cooling capability. The epoxy and CSR components of the resinous part were mixed first under high heat (between 150° F. and 200° F.) to get a homogeneous, resinous mixture. The mixture was cool down to 150° F. and Epon 58005 was added to the mixture. Epon 58005 was pre-heated at 120° F. prior to adding to the mixture to facilitate handling. The mixture was cooled to 90° F. and fumed silica was then added. Mixing continued while applying vacuum to de-air the mixture. The resulting resinous base was then removed from the mixer when the temperature was below 80° F. For the catalyst part, the amine curing agent(s) and fumed silica were added to the mixer and mixed at room temperature until the silica was uniformly dispersed.

Example 2

A two-part adhesive based on Part A-1 and Part B-1 (disclosed in Example 1), and a two-part adhesive based on Part A-2 and Part B-3 (disclosed in Example 1), have the properties shown in Table 3. The mixed density (i.e. specific gravity) was determined after mixing the resinous part with the catalyst part at room temperature, and after curing at 93° C. (200° F.).

TABLE 3

| Properties of Two-Part Adhesive | | | |
|---|---|---|---|
| | | Part A-1 & Part B-1 | Part A-2 & Part B-3 |
| Mix ratio | By weight | 2:1 | 2:1 |
| Viscosity at 24° C. (Poise) | Part A | 810 | 850 |
| | Part B | 200 | 200 |
| | Mixed viscosity | 400 | 420 |
| Vertical slump at 24° C. (mm) | 9.525 mm thickness bead (⅜ inch thick beads) | 3.6 | 3 |
| Density (g/cc) | Part A | 1.1 | 1.1 |
| | Part B | 0.99 | 1.0 |
| | Mixed density before curing | 1.05 | 1.05 |
| | Mixed density after curing | 1.05 | 1.05 |

Example 3

Bonding Performance

Metal bonding performance and composite bonding performance of various two-part adhesives based on the formulations disclosed in Example 1 were measured. Al-2024-T3 aluminum sheets from Alcoa Inc. were used as the substrates for metal-metal bonding. The aluminum metal was first wiped with a solvent; followed by alkaline degreasing, FPL etching (chrome sulphuric etch), and phosphoric acid anodization (PAA) per ASTM 3933. Solvent based primer BR®127 from Cytec Industries Inc. was sprayed on the aluminum metal to a thickness of 0.00015 inches. The primer was air dried for 15 minutes and then cured at 121° C. (250° F.) for 60 minutes. Two aluminum sheets were bonded to each other by applying the paste adhesive between the sheets. The glue line thickness is controlled with glass beads at about 10 mils (254 microns). All bonded samples were cured in a hot press at temperatures between 71° C. (160° F.) and 93° C. (200° F.) for the stated length of time. Contact pressure from 0.021 to 0.035 MPa (3 to 5 psi) was applied throughout curing. The metal-metal adhesion strength (Wide Area Tap Shear—WALS) and toughness (floating roller peel—FRP, or Climbing drum peel—CDP) properties of the paste adhesive were tested at different temperatures. The testing results are reported as the mean average of five specimens for each test group. Glass transition temperature ($T_g$ onset) of the cured paste adhesive was determined using a thermal mechanical analyzer (TMA 2940) from TA Instruments.

Composite bonding was carried out using fiber-reinforced prepregs as test substrates. The prepregs used were pre-cured Torayca® T800H/3900-2 prepreg tape from Toray Composites, inc. Either a dry polyester peel ply or resin-rich peel ply was used as surface treatment on the composite substrates. Curing was carried out under out-of-autoclave (OOA) conditions.

For bonding performance testing, the following test methods were used:

a) Wide Area Lap Shear (WALS)—ASTM D3165
b) Floating Roller Peel (FR Peel)—ASTM D3167
c) Double Cantilever Beam (DCB, $G_{1C}$) for composite bonding—ASTM D5528

Table 4 shows the metal bonding properties of a paste adhesive formed by mixing Part A-2 and Part B-1 at mix ratio (A:B) of 2:1 by weight.

TABLE 4

|  | Press Curing Cycles | | | | |
| --- | --- | --- | --- | --- | --- |
|  | 200° F.-2 hrs WALS | 200° F.-1.5 hrs WALS | 180° F.-4 hrs WALS | 160° F.-6 hrs WALS | 160° F.-4 hrs WALS |
| WALS @RT, psi | 5072 | 5125 | 5237 | 4961 | 4889 |
| WALS @180° F./82° C., psi | 3896 | 3757 | 3963 | 3605 | 3505 |
| WALS @250° F./121° C., psi | 1188 | 1081 | 1426 | 1391 | 579 |
| FR Peel @RT, pli | 56 | 58 | 72 | 73 | 58 |
| $T_g$ (Dry, ° C.) | 114 | 108 | 105 | 99 | 94 |

Table 5 shows the composite-composite bonding properties of a paste adhesive formed by mixing Part A-1 and Part B-1 at mix ratio (A:B) of 2:1 by weight.

TABLE 5

|  |  | Composite bonding properties | |
| --- | --- | --- | --- |
|  |  | 200° F.-2 hrs | 180° F.-4 hrs |
| Lap Shear (WALS, psi) | 75° F./25° C. | 5105 | |
|  | 180° F./82° C. | 3759 | |
|  | 250° F./121° C. | 2560 | |
| $G_{1C}$ Fracture Toughness (in-lb/in²) | 75° F./25° C. | 5.8 | 7 |

Table 6 shows the metal-metal bonding properties of a paste adhesive formed by mixing Part A-2 and Part B-3 at mix ratio (A:B) of 2:1 by weight.

TABLE 6

|  | Curing Cycles | | |
| --- | --- | --- | --- |
| Property | 160° F.-4 hrs WALS | 200° F.-2 hrs WALS | 220° F.-1 hr WALS |
| WALS @RT, psi | 4893 | 5228 | 4905 |
| WALS @180° F./82° C., psi | 3658 | 3955 | 3724 |
| WALS @250° F./121° C., psi | 896 | 1555 | 2064 |
| FR Peel @RT, pli | 74 | 67 | 55 |
| $T_g$ (Dry, TMA), ° C. | 94 | 101 | 102 |

Table 7 shows the metal-metal bonding properties of a paste adhesive formed by mixing Part A-1 and either Part B-4 or Part B-5 at mix ratios indicated (by weight).

TABLE 7

|  | Part A-1/ Part B-4 | Part A-1/ Part B-4 | Part A-1/ Part B-4 | Part A-1/ Part B-5 |
| --- | --- | --- | --- | --- |
|  | Curing Cycles | | | |
| Property | 150° F.-1 hr WALS | RT-7 Days WALS | 150° F.-1 hr WALS | 150° F.-1 hr WALS |
| WALS @RT, psi | 4850 | 3883 | 4230 | 4782 |
| WALS @180° F., psi | 3000 | 2100 | 2532 | 2964 |
| WALS @250° F., psi | 1500 | 1500 | 1740 | 1954 |
| FR Peel @RT, pli | 50 | 10 | 33 | 43 |
| Mix Ratio (A/B) | 4 to 1 | 4 to 1 | 5 to 1 | 5 to 1 |
| $T_g$ (Dry, ° C.) | 93 | 65 | 95 | 97 |

The room-temperature curable, two-part, adhesive based on Part A-1 combined with Part B-4 (A:B weight ratio of 4:1) was tested for composite bonding. The results show a $G_{1c}$ value of 4.5 in-lb/in² (788 J/m²) and cohesive failure mode.

Comparative Examples

For comparison, each of Part A-8 and Part A-9 disclosed in Table 1B was mixed with Part B-1 formulation disclosed in Table 2 to form a paste adhesive. The resultant adhesives were then tested for metal-metal bonding properties as described above. The results are shown in Table 8.

TABLE 8

|  | Metal Bonding Property | |
| --- | --- | --- |
|  | Part A-8/Part B-1 | Part A-9/Part B-1 |
|  | Curing Cycles | |
|  | 200° F.-2 hrs WALS | 180° F.-4 hrs WALS |
| WALS @RT, psi | 4858 | 5269 |
| WALS @180° F., psi | 3980 | 3791 |
| WALS @250° F., psi | 2803 | 1920 |
| FR Peel @RT, pli | 10 | 50 |
| Tg (Dry, ° C.) | 128 | 121 |

Table 8 shows that the floating roller peel strength at room temperature of the comparative adhesives is lower than that of the more preferred adhesives at the same curing temperature.

Example 4

Effect of Bond Line Thickness on Paste Adhesive Bonding Performance

The effect of bond line thickness on the metal-metal bonding performance of the paste adhesive was measured using bonded aluminum specimens, wherein the adhesive bonding was done using a two-part adhesive composed of Part A-1 and Part B-1 formulations disclosed in Example 1, at mix ratio of 2:1. Curing was carried out under OOA curing at 93° C. for 2 hours. Results for WALS and FRP testing with varying bond line thicknesses are shown in Table 9. The paste adhesive showed decreases in both lap shear and peel strength with increasing bond line thickness. However, the peel strength was much more tolerant to bond line thickness variation. At high bond line thickness (40-80 mils), the paste adhesive exhibited fairly high peel strength and mainly cohesive failure mode. At high bond line thickness, it also retained more than 50% of its original wide area lap shear strength. The good tolerance of the paste adhesive to bond line thickness variation reflects its intrinsically high toughness. The tolerance to the high glue line thickness makes it very attractive for structural bonding applications where non-uniform or high bond line thickness occurs.

TABLE 9

| | Cure Cycle 93° C., 2 hrs | | | | | |
|---|---|---|---|---|---|---|
| | WALS 25° C. (psi) | WALS 82° C. (psi) | WALS 121° C. (psi) | FRP 25° C. (pli) | FRP 82° C. (pli) | FRP 121° C. (pli) |
| 0.254 mm (10 mils) | 5202 | 3741 | 2668 | 55 | 67 | 50 |
| 0.508 mm (20 mils) | 4304 | 2797 | 1797 | 48 | 102 | 54 |
| 1.016 mm (40 mils) | 2872 | 2865 | 1305 | 43 | 63 | 59 |
| 2.032 mm (80 mils) | 2667 | 2842 | 1521 | — | — | — |

Example 5

Effect of Humidity Exposure on Adhesive Bonding Performance

To ensure the durability of composite-to-composite or composite-to-metal bonded structures, a tough, moisture-resistant, flow-controlled epoxy-based adhesive is required. Toughened adhesives must have good durability performance under hot/wet conditions and other environmental exposure conditions. The effect of post-bond humidity on the paste adhesive was evaluated by exposing individually cut, wide area lap shear specimens to air at 71° C. and 100% relative humidity (RH) for 14 days, or exposing them at 49° C. and 100% RH for 30 days. Table 10 shows the results for bonded metal specimens, which were formed using a two-part adhesive composed of Part A-1, and Part B-1 mix ratio 2:1. As shown in Table 10, the paste adhesive demonstrates excellent retention of shear strength after post-bond humidity exposures. The failure modes for the hot/wet exposed specimens were mainly cohesive or thin cohesive reflecting the good humidity resistance of the material.

TABLE 10

| Metal Bonding WALS (psi) @Test Temperature | Dry | Wet-14 day @160° F.-100% RH | Exposed-30 day @120° F.-100% RH |
|---|---|---|---|
| 180° F. | 3627 | 3418 | 3757 |

The composite bonding performance of the same two-part adhesive (Part A-1/Part B-1, mix ratio 2:1) was determined using WALS and double cantilever beam ($G_{1C}$) test as described in Example 3. Curing was carried out at 200° F. for 2 hours. The results after aging exposure to humidity are shown in Table 11.

TABLE 11

| Composite Bonding WALS (psi) @Test Temperature | Dry | Wet-14 day @160° F.-100% RH | Exposed-30 day @120° F.-100% RH |
|---|---|---|---|
| 180° F. | 3356 | 3345 | 3449 |
| 160° F. | 3759 | 3977 | 3790 |

Example 6

One-Part System

Table 12 shows exemplary one-part adhesive formulations 1A-1E. All amounts are expressed in parts.

TABLE 12

| Components | 1A | 1B | 1C | 1D | 1E |
|---|---|---|---|---|---|
| ~25 wt. % CSR particles (particle size = 70-90 nm) dispersed in liquid Bisphenol A diglycidyl ether | 55 | 57 | 50 | 52 | 53 |
| Triglycidyl ether of aminophenol | 10 | 11 | 9.3 | 9.7 | 16.5 |
| Low viscosity cycloaliphatic diepoxide | 6.9 | 7.1 | 6.2 | 6.5 | — |
| Tetraglycidyl ether of methylene dianiline | 3.4 | 3.6 | 3.1 | 3.1 | 3.3 |
| Core-Shell Rubber (CSR) particles (ave. particle size 200 nm) | 4.1 | 4.3 | 3.7 | 3.9 | 4 |
| PES-PEES thermoplastic polymer | — | — | — | — | 4 |
| Low MW adduct of epichlorohydrin & bisphenol A | 6.9 | 7.1 | 6.2 | 6.5 | 6.6 |
| Elastomer-modified epoxy functional adduct | 3.5 | 3.5 | 3.1 | 3.2 | 3.3 |
| Dicyandiamide | 4.2 | 4.2 | 3.7 | 3.7 | 4 |
| Bisurea | 4.8 | — | 1.2 | 1.2 | 4 |
| Hydrophobic fumed silica | 1.3 | 1.3 | 1.3 | 1.3 | 2 |
| 2-ethyl-4-methyl-imidazole | 0 | 2.8 | 0 | 0 | — |
| Intelimer encapsulated 2-ethyl-4-methyl-imidazole | 0 | 0 | 12 | 0 | — |
| Modified aliphatic. amine | 0 | 0 | 0 | 6.5 | — |
| Total | 100.1 | 101.9 | 99.8 | 97.6 | 100.7 |

The metal bonding properties of Formulations 1A-1E were measured as described in Example 3. The results are shown in Table 13.

TABLE 13

| | Metal Bonding Property | | | | |
|---|---|---|---|---|---|
| | 1A | 1B | 1C | 1D | 1E |
| | Curing Cycles | | | | |
| | 200° F.-2 hrs | 200° F.-2 hrs | 200° F.-2 hrs | 200° F.-2 hrs | 200° F.-1.5 hrs |
| WALS @RT, psi | 4285 | 4150 | 2905 | 3137 | 4129 |
| WALS @180° F., psi | 3857 | 3810 | 3111 | 2581 | 3560 |
| WALS @250° F., psi | 2617 | 2655 | 1850 | 1210 | 2882 |
| FR Peel @RT, pli | 36 | 31 | 45 | 21 | 28 |
| $T_g$ (Dry, TMA) - ° C. | 114 | 116 | 108 | 78 | 113 |

The composite bonding properties of Formulation 1A were measured as described in Example 3. For WALS measurement, polyester peel ply was used for surface treatment prior to bonding, and for $G_{1c}$ measurement, the composite surface was treated by plasma prior to bonding. The results are shown in Table 14.

TABLE 14

| Composite bonding property | | Composite Surface treatment | 200° F./2 hrs |
|---|---|---|---|
| WALS, psi | 75° F. | Polyester peel ply | 6112 |
| | 180° F. | Polyester peel ply | 4173 |
| | 250° F. | Polyester peel ply | 3120 |
| $G_{1c}$ (in-lb/in$^2$) | | Air plasma treated surface | 4.1 |

Ranges disclosed herein are inclusive and independently combinable (e.g., ranges of "up to approximately 25 wt %, or, more specifically, approximately 5 wt % to approximately 20 wt %" is inclusive of the endpoints and all intermediate values of the ranges of "approximately 5 wt % to approximately 25 wt %," etc).

While various embodiments are described herein, it will be appreciated from the specification that various combinations of elements, variations of embodiments disclosed herein may be made by those skilled in the art, and are within the scope of the present disclosure. In addition, many modifications may be made to adapt a particular situation or material to the teachings of the embodiments disclosed herein without departing from essential scope thereof. Therefore, it is intended that, the claimed invention not be limited to the particular embodiments disclosed herein, but that the claimed invention will include all embodiments falling within the scope of the appended claims.

What is claimed is:

1. A two-part system for forming a structural adhesive comprising a resinous part (A) and a separate catalyst part (B), the resinous part (A) comprising:
at least two different multifunctional epoxy resins with different epoxy functionality selected from di-functional, tri-functional, and tetra-functional epoxy resins;
smaller core-shell rubber particles having particle sizes less than 100 nm and larger core-shell rubber particles having particle sizes greater than 100 nm, the weight ratio of smaller core-shell rubber particles to larger core-shell rubber particles being in the range of 3:1 to 5:1;
at least one of (i) an elastomeric polymer with a functional group capable of reacting with the multifunctional epoxy resins and (ii) a polyethersulfone polymer having an average molecular weight in the range of 8,000-14,000; and
inorganic filler particles in an effective amount to control rheology of the resinous part;

the catalyst part (B) comprising:
at least one amine curing agent selected from the group consisting of: dicyclohexylamine, amine-terminated piperazine, polyethylene polyamine, and combinations thereof; and
inorganic filler particles present in an effective amount to control rheology of the catalyst part;

wherein the weight ratio of part (A) to part (B) is within the range of 3:2 to 10:2; and wherein, when part (A) and part (B) are mixed and then cured in a temperature range of 65-93° C. (150-200° F.), the resulting structural adhesive has a glass transition temperature (Tg) of greater than 95° C. (203° F.), a lap shear strength of 33-37 MPa at 20° C.-25° C., 24-27 MPa at 82° C., and 15-18 MPa at 121° C. according to ASTM D3165, and a peel strength of 250-350 Nm/m at 20° C.-25° C. according to ASTM D3167.

2. The two-part system of claim 1, wherein the weight ratio of part (A) to part (B) is 2:1.

3. The two-part system of claim 1, wherein the amine curing agent is a dicyclohexylamine selected from the following:

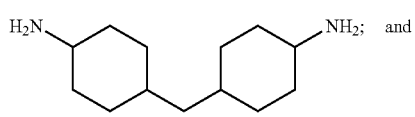

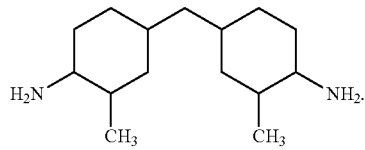

4. The two-part system of claim 1, wherein the amine curing agent is a combination of tetraethylene pentamine (TEPA) and amine-terminated piperazine.

5. The two-part system of claim 1, wherein the inorganic filler particles in the resinous part (A) are hydrophobic silica particles having surface area in the range of 90-380 m²/g, and the inorganic filler particles in the catalyst part (B) are hydrophilic silica particles having surface area in the range of 90-380 m²/g.

6. The two-part system of claim 1, wherein the at least two different multifunctional epoxy resins comprise a combination of non-cycloaliphatic difunctional epoxy resin, trifunctional epoxy resin, tetrafunctional epoxy resin, and cycloaliphatic multifunctional epoxy resin.

7. The two-part system of claim 1, wherein the at least two different multifunctional epoxy resins comprise at least one cycloaliphatic epoxy.

8. The two-part system of claim 1, wherein the polyethersulfone polymer is a polyethersulfone-polyetherethersulfone (PES-PEES) copolymer.

9. The two-part system of claim 1, wherein the elastomeric polymer is selected from the group consisting of carboxyl-terminated butadiene nitrile (CTBN), amine-terminated butadiene acrylonitrile (ATBN), and an epoxy-elastomer adduct formed by reacting an epoxy resin with CTBN or ATBN.

10. The two-part system of claim 1, wherein the smaller core-shell rubber particles have particle sizes within the range of 50-90 nm and the larger core-shell rubber particles have particle sizes within the range of 150-300 nm.

11. A laminate structure comprising a first substrate bonded to a second substrate with a cured structural adhesive film between the first and second substrates;
wherein the cured structural adhesive film is formed by mixing part (A) and part (B) of the two-part system of claim 1 and then curing in a temperature range of 65-93° C. (150-200° F.); and
wherein the cured structural adhesive film has a thickness of 10-80 mils.

12. The laminate structure of claim 11, wherein the first and second substrates are metal substrates.

13. The laminate structure of claim 12, wherein the first and second substrates are made of aluminum or aluminum alloy.

14. The laminate structure of claim 11, wherein the first substrate is a metal substrate and the second substrate is a fiber-reinforced resin composite.

15. The laminate structure of claim 11, wherein the first and second substrates are fiber-reinforced resin composite substrates comprising reinforcing fibers and a resin matrix, and the adhesive film exhibits a fracture toughness of greater than 650 J/m² (3.5 in-lb/in²) according to ASTM D5528.

16. The laminate structure of claim 15, wherein the adhesive film exhibits a fracture toughness in the range of 651-1500 J/m² (3.5 to 8.1 in-lb/in²).

17. The laminate structure of claim 11, wherein the Tg and lap shear strength of the cured structural adhesive film are retained by more than 90% after aging exposure to air containing relative humidity of 100% at 71° C. for 14 days or at 49° C. for 30 days.

* * * * *